March 17, 1970 D. C. BECKNELL 3,501,698
METHOD AND APPARATUS FOR TESTING CIRCUITS ON CIRCUIT
BOARDS FOR CONTINUITY INCLUDING THE USE OF
ELECTROSENSITIVE PAPER RESPONSIVE TO
CURRENT FLOW THROUGH THE CIRCUITS
Filed Aug. 25, 1967 3 Sheets-Sheet 1

INVENTOR.
DONALD C. BECKNELL
BY
ATTORNEY

INVENTOR.
DONALD C. BECKNELL

ATTORNEY

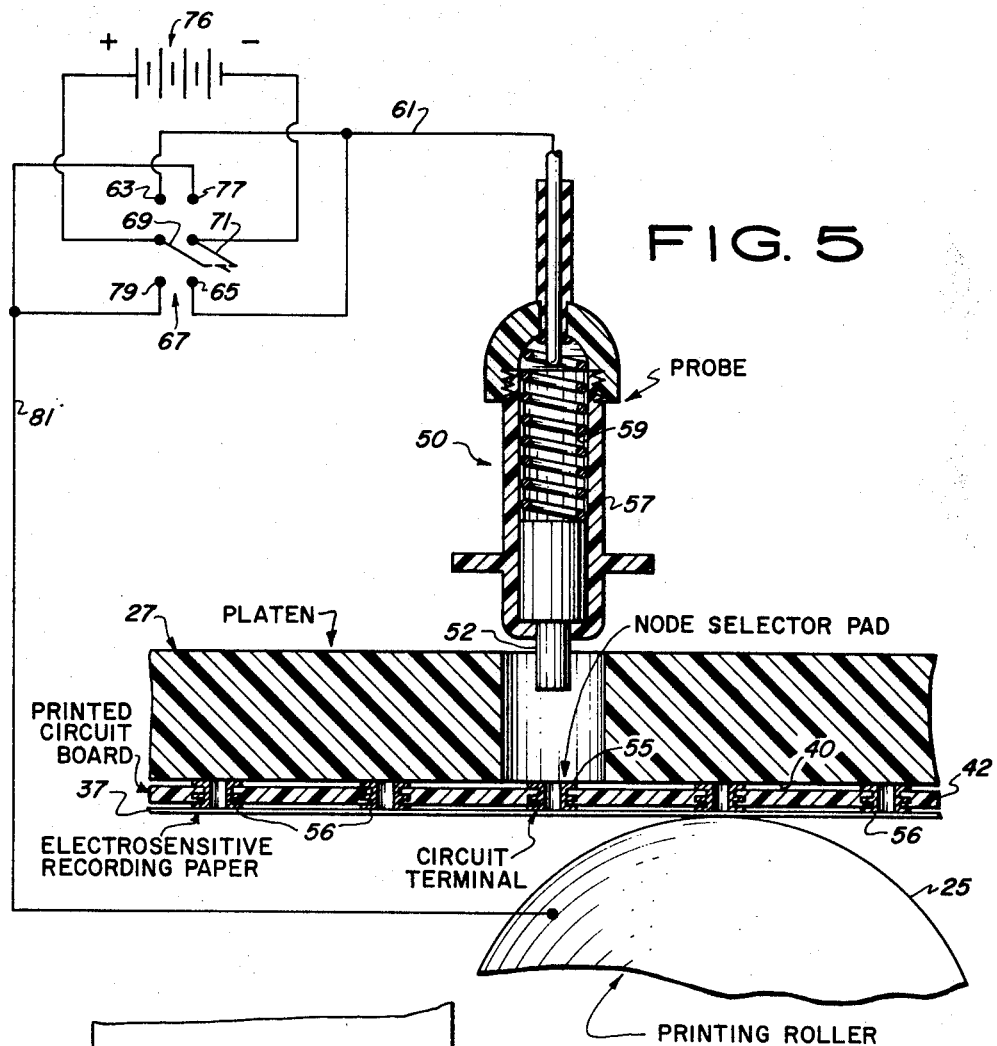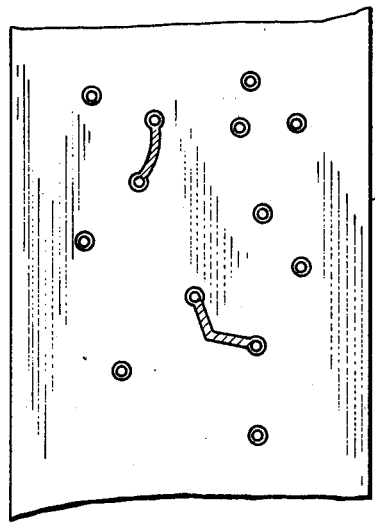

United States Patent Office 3,501,698
Patented Mar. 17, 1970

3,501,698
METHOD AND APPARATUS FOR TESTING CIRCUITS ON CIRCUIT BOARDS FOR CONTINUITY INCLUDING THE USE OF ELECTROSENSITIVE PAPER RESPONSIVE TO CURRENT FLOW THROUH THE CIRCUITS
Donald C. Becknell, Franklin Lakes, N.J., assignor to The Bendix Corporation, a corporation of Delaware
Filed Aug. 25, 1967, Ser. No. 663,336
Int. Cl. G01r 35/00
U.S. Cl. 324—158                    14 Claims

ABSTRACT OF THE DISCLOSURE

A method and device for inspection of a multilayer printed circuit board having a multiplicity of rivers or conductive circuits and including the provision of electrical tests to verify the continuity and anti-continuity of the tested circuit. The test device has a platen with a recess machined to an outline of a multilayer circuit board and preset holes drilled in the platen at points coinciding with nodes of the multilayer printed circuit board available at the printed circuit board surface. One hole is drilled in the platen for selective connection by means of an operator-operative probe to a pad or terminal for each node or continuous circuit of the multilayer circuit board. Moreover a roller assembly including an electrically conductive roller bears under spring tension against a sheet of electrosensitive recording paper which is in turn pressed against the electrically conductive terminals of the circuits of the multilayer circuit board under test. The circuit board nests in the platen so that the roller may pass over a surface of the board to complete a test circuit through the electrosensitive paper with the electrically conductive terminals of the circuit of the multilayer circuit board to which the probe is connected. The probe inserted in the selected node of the multiple layer circuit board is electrically connected through rivers or electrical conductors leading from the selected node and certain of the electrically conductive terminals so as to complete the test circuit upon the roller being advanced across the surface of the sheet of electrosensitive recording paper. The recording paper thus pressed by the roller against the conductive terminals is effectively discolored at the points of emergence of the flow of electrical energy relative to the terminals to provide an image upon the electrosensitive recording paper of the relative locations of the several terminals of the circuit under test. This image formed on the recording paper may then be compared with an image of a master pattern for the node or continuous circuit under test to determine any fault or discontinuity in the electrical circuit under test.

BACKGROUND OF THE INVENTION

Field of the invention

The invention is in the field of inspection of printed circuit boards and is specifically directed to a method and device for effecting continuity testing of multilayer circuit boards. The invention is particularly directed to a method and means for effective identification of faults such as cut or shorted rivers of electrical conductors in the several layers of a multilayer circuit board by electrical tests as well as verification of the continuity and the anti-continuity of the several circuit elements at the multiple layers of the circuit board.

Description of the prior art

Heretofore it has been a common practice to rely on a visual inspection of printed circuit boards to identify common faults such as cut or shorted conductor rivers or terminals.

However as such printed circuit boards have progressed from a single layer to multiple layers of printed circuits, it has become progressively more difficult to effectively inspect such circuit boards, since multilayer circuit boards may contain inner layers which are invisible and which accordingly have heretofore required for adequate inspection much time consuming and tedious operator manipulated individual electrical circuit element tests to verify continuity and anti-continuity of the multiplicity of circuit elements in such multilayer circuit boards.

A number of probe devices have been heretofore utilized to sense faults in printed circuit boards, as shown in U.S. Patent No. 2,887,622, granted May 19, 1959, to Charles C. Rayburn and Robert L. Henry and in U.S. Patent No. 3,137,815, granted June 16, 1964, to Richard D. Hershey, and to test for continuity of electrical or electronic circuitry. These prior devices have failed to suggest the concept of the present invention in the method and idea of means herein provided for utilization of electrosensitive recording paper to indicate electrical continuity in a multilayer printed circuit board and a fault or cut or short in a circuit element in one or more of the multiple layers thereof.

However in the past various forms of electrosensitive recording paper have been developed and have been extensively provided in graphic recording, such as for example, in strip chart recorders and in facsimile equipment to which reference has been made by the Alfax Paper and Engineering Co., Inc.—Alden Research Center, Westboro, Mass., in a "Design and Data Sheet" relative to Alfax Type "A" Paper and in a "Design and Data Sheet" relative to Alfax Type "A2" Paper, both sheets having a claim to copyright of 1961 by the Alfax Paper and Engineering Co., Inc.

Such prior art fails to suggest the method and device of the present invention in that there is no suggestion therein of the provision of an electrosensitive recording paper operatively arranged between electrically conductive terminals of a multilayer circuit board and an electrically conductive roller passing over the recording paper and terminals so as to cause a discoloration of the electrosensitive recording paper at the points of emergence of the flow of electrical energy and thereby form on the electrosensitive recording paper an image of the relative locations of the several conductive terminals in a pattern to be later visually compared with a predetermined circuit pattern to ascertain any variation therefrom as an indication of an electrical fault or discontinuity in the circuit under test.

SUMMARY OF THE INVENTION

The invention contemplates a device for testing a multilayer circuit board including means whereby an electrosensitive recording paper may be positioned between electrically conductive terminals of a multilayer circuit board together with an electrically conductive roller arranged in cooperative relation with the recording paper and terminals of the circuit board so as to pass over the same to cause a discoloration of the electrosensitive recording paper at the points of emergence of the flow of electrical energy so as to thereby form on a surface of the electrosensitive recording paper a pictorial image of the relative locations of the several conductive terminals in a pattern to be later visually compared with a predetermined circuit pattern to ascertain any variations therefrom as an indication of an electrical fault or discontinuity in the circuit under test.

It is, therefore, an object of the present invention to provide a method and means of forming on an electrosensitive recording paper an image of the relative location of a multiplicity of output terminals of any one of the many rivers or electrically conductive circuits provided in a multilayer printed circuit so that the image so formed on the electrosensitive paper in turn may be compared with a master pattern so as to ascertain the variations therefrom in the so formed image as an indication of an electriacl fault or discontinuity in the circuit under test.

Another object of the invention is to provide a method for applying an electrosensitive recording paper to terminals of a printed circuit board so as to provide on the recording paper an image of the relative locations of the respective terminals effective under a given test so that upon a comparative visual inspection with a master pattern of the image which should result from the given test, it may be readily ascertained whether there are faults or discontinuities in the tested circuit of the multilayer circuit board.

Another object of the invention is to provide a method for effecting line rather than area contact between the electrosensitive paper and the output terminals of the circuit under test of a multilayer printed circuit board so as to enhance the resolution of the image formed on the paper at the emergence points of current flow and thereby limit the spread of current flux through the paper by the line rather than area contact effected in the test operation.

Another object of the invention is to provide a test device for effecting a line rather than area contact between the electrosensitive paper and the terminals of the circuit of a multilayer printed circuit board under test through a printing roller which is biased under spring tension into contacting relation with the electrosensitive paper so as to provide as it passes along the paper a line rather than an area contact with the paper which enhances the resolution of the image formed thereon at the points of the emergence of the current flow by limiting the spread of current flux through the electrosensitive paper.

Another object of the invention is to provide a continuity tester for a multilayer printed circuit card in which as an electrically conductive roller is advanced so as to cross a surface of the printed circuit card, an image forms on a sheet of electrosensitive recording paper at the points of electrical current flow from the printed circuit card, in that the recording paper is pressed by the roller against te printed circuit card in a line contact therewith so as to indicate on the paper the points of the card which are electrically continuous with a conductive circuit contacted by a probe inserted through one of a plurality of holes in a platen and preselected by the operator.

Another object of the invention is to provide a printed circuit board tester for forming the aforenoted image on an electrosensitive recording paper which may in turn be compared to a master image so to verify that the appropriate output points for such circuit appear for the tested circuit.

Another object of the invention is to provide a printing process for testing the conductivity of a selected circuit of a multilayer printed card, and a process which is electrolytic in nature in that there is provided a recording paper which is suitably treated with an electrolytic solution that discolors in the presence of ferrous ions, so that ferrous ions may be plated from a stainless steel printing roller onto the recording paper by the flow of electrical current from the roller to the conductive terminals of the conductive circuit to form an image of the conductivity conditions of the selected circuit.

Another object of the invention is to provide a tester for a printed circuit card which provides in one pass of a printing roller a printed record on a recording paper of the continuity or lack of continuity between a terminal of a selected circuit of a printed circuit card and all other electrical terminal points of the circuit of the printed circuit board which are conductively connected thereto through the multilayers of the board.

Another object of the invention is to provide a tester for a printed circuit board providing a printing roller and a recording paper in cooperative relation with the printed circuit card for making a permanent record on the paper of the electrical continuity conditions of a selected conductive circuit in the card which may in turn be compared with a master image to ascertain the electrical conductive conditions thereof.

Another object of the invention is to provide a method and tester device wherein a recording paper is provided to indicate electrical continuity of a selected electrical circuit of many in a multilayer printed circuit board.

Another object of the invention is to provide an inexpensive method and device for continuity testing of multilayer printed circuit boards.

Another object of the invention is to provide a simple device for effecting electrical continuity testing of multilayer printed circuit boards and a device including an insulating platen which is machined at the underside to the outline of a printed circuit board. The platen including therein several holes selectively drilled over points of the circuit card where inner layer nodes of the board become available at the printed circuit board surface and in which only one hole is drilled for a node of each circuit to be tested. Further interiorly mounted in the tester is a roller assembly including a stainless steel printing roller carried by two auxiliary rollers biased under spring tension into contacting relation therewith and operable by a control bar so that the rollers may be positioned along the interior surface of the tester with the printing roller bearing under the tension of the spring against the sheet of electrosensitive recording paper which is pressed thereby against a lower surface of the printed circuit board under test which has an opposite upper surface which nests in the platen. Moreover a probe inserted through one of the holes of the platen is connected to a negative terminal of a source of electrical energy while a positive terminal of the source of electrical energy is connected to the printing roller so that as the roller is advanced across the surface of the printed circuit and the recording paper an image forms thereon due to the presence of ferrous ions plated from the stainless steel roller onto the recording paper.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

BRIEF DESCRIPTION OF THE DRAWINGS

Referring to the drawings in which corresponding numerals indicate corresponding parts in the several views:

FIGURE 5 is an enlarged fragmentary sectional view showing in schematic detail the operative arrangement of a circuit selector probe and terminals of the printed circuit board in relation to the electrosensitive recording paper and the printing roller.

FIGURE 6 is a plan view of a typical electrosensitive recording paper bearing an image formed thereon by a continuity test of the printed circuit board conducted by the method and tester device of the present invention.

DESCRIPTION OF THE INVENTION

Figure 1:
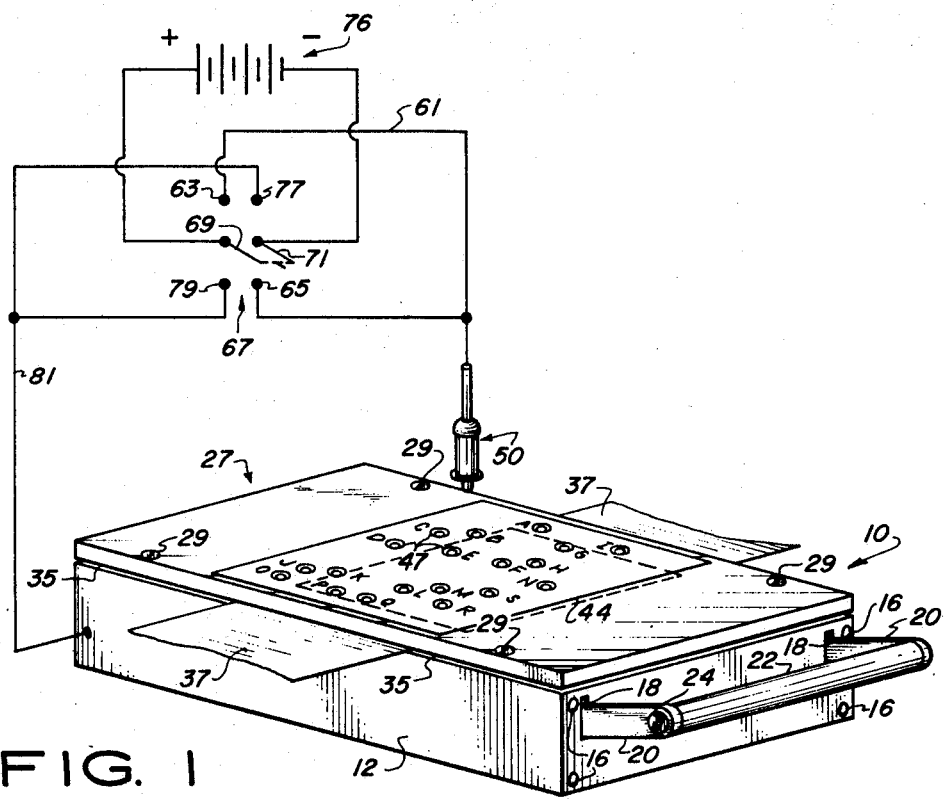
FIGURE 1 is a top plan perspective view of the continuity tester embodying the present invention with a sheet of electrosensitive recording paper in operative relation in the tester together with a probe selectively connecting the source of electrical energy into a conductive circuit of a multilayer printed circuit board in the tester, as best shown in FIGURE 5.
Figure 2:
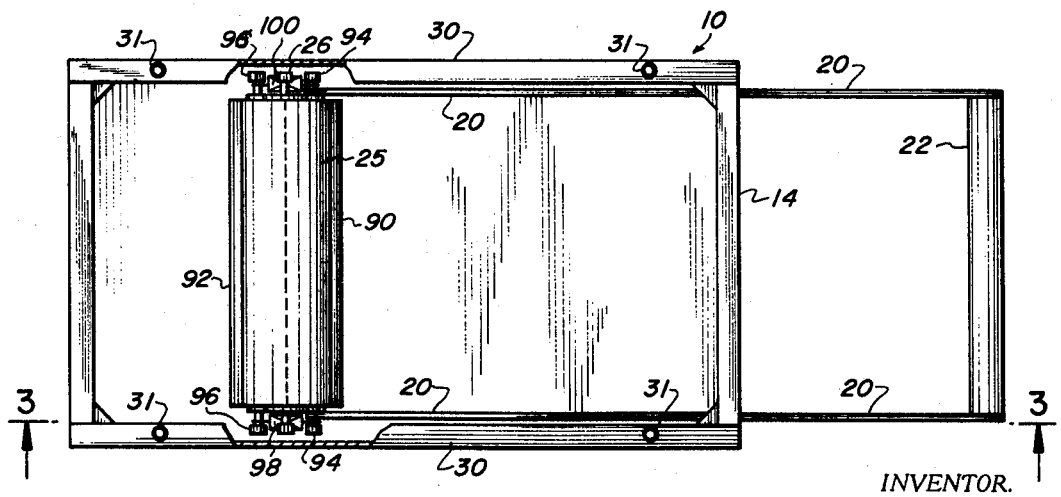
FIGURE 2 is a top plan view of the tester device of FIGURE 1 with the top platen removed and showing the roller assembly therein including a stainless steel printing roller and thereunder a pair of smaller steel supporting auxiliary rollers biased under spring tension into contacting relation with the printing roller with an operating handle pivotally connected to one of the auxiliary rollers, as best shown in FIGURE 3.

Referring now to FIGURE 1 the tester device is indicated generally by the numeral 10 and includes a rectangular shaped box 12 of an electrically conductive material. At one end of the box 12 there is provided an end plate 14 fastened to the end walls of the box 12 by fastening bolts 16 and having formed in the end plate 14 longitudinal slots 18 in which are slidably mounted actuating rods 20 positioned by an external operating handle 22 connected at the outer ends of the bars 20 by suitable bolts one of which is indicated at 24. The actuating rods 20 extend from the exterior into the box 12 for positioning therein a stainless steel printing roller 25 having a free shaft 26, as shown in FIGURES 2 and 3, and carried by a roller assembly, as hereinafter explained in greater detail.

Figure 3:
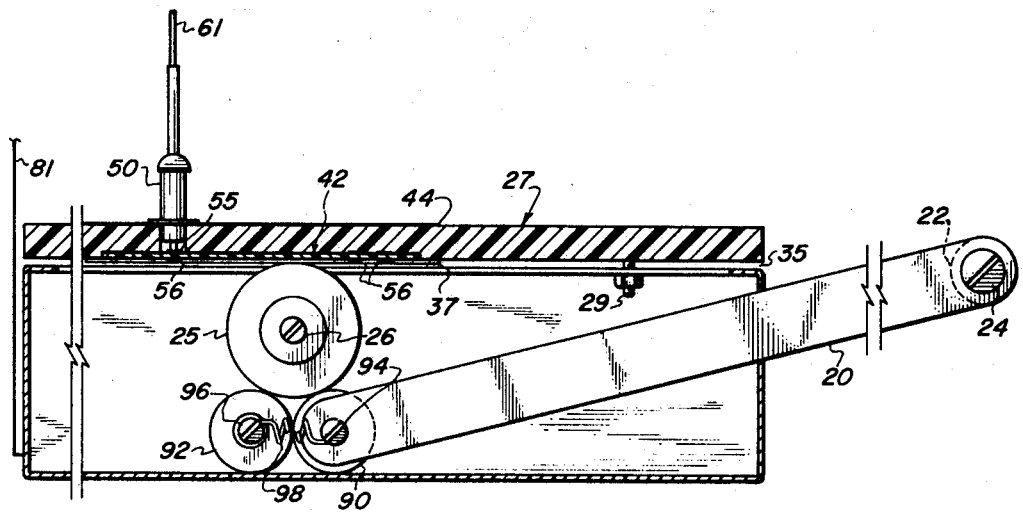
FIGURE 3 is a sectional view of the tester device taken along the lines 3—3 of FIGURE 2 and looking in the direction of the arrows.

Secured at the top of the rectangular casing or box 12, as shown in FIGURES 1 and 3, is a platen 27 formed of a suitable electrical insulating material. Suitable screw threaded bolts 29 secure the platen 27 to upper flange portions 30 of the box 12 by engaging in screw threaded engagement in nut portions 31 carried by the upper flange portions 30 of the box 12. Thus in the fastened position the platen 27 is positioned in a slightly spaced relation, indicated at 35 of FIGURE 1, to the flange 30 so as to permit the free passage of an electrosensitive recording paper or web 37 through the passage 35 between the platen 27 and the upper flange portion 30 of the box 12, as shown in FIGURE 1.

Figure 4:
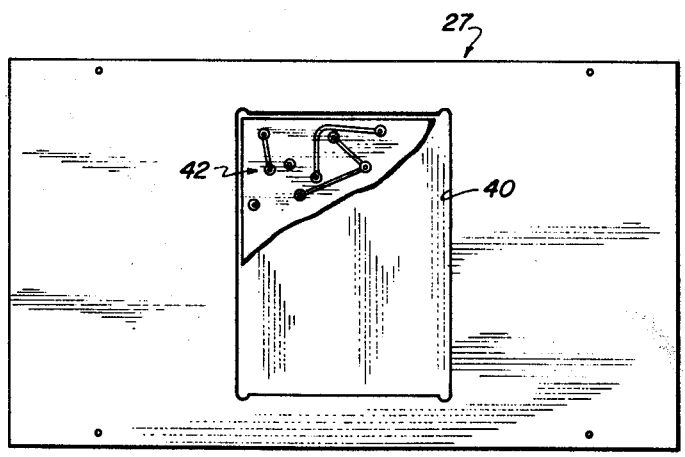
FIGURE 4 is a plan view of an underside of the top platen of FIGURE 1 and showing a printed circuit board to be tested in a nesting relation within a recessed cavity formed in the platen.

The underside of the platen 27 is machined at a recess 40 to the outline of the printed circuit board 42 to be subject to test, as shown in FIGURE 4. On the opposite or outer side of the platen 27 there is provided a coded card 44 bearing a number of holes 47 indicated by letters A through S. The holes 47 are drilled through the platen 27 into the machined recess 40 and immediately over predetermined terminal points of the printed circuit board 42 where inner layer nodes leading to different conductive circuits within the multilayer circut board 42 become avalable at the printed circuit board surface. Only one such hole A through S is drilled for each node. A probe 50 as shown in FIGURES 1, 3 and 5 may be inserted by the operator in a selected hole 47 so that an inner contact element 52 of the probe 50 may make electrical contact with a pad 55 of a conductive circuit of the printed circuit board 42 having terminals 56 of the selected circuit, as indicated in FIGURES 3 and 5.

The contact element 52 of the probe 50, as probably best shown in FIGURE 5, is slidably mounted within a housing 57 of the probe 50 having a spring element 59 biasing the contact element 52 outwardly and permitting the contact element 52 to recede within the housing 57 so as to permit the contact element 52 to make a firm electrical contact with the pad 55. Further the probe 50 is suitably connected through an electrical conductor 61, as shown in FIGURES 1 and 5, to the switch contacts 63 and 65 of a two-way switch 67 having switch blades 69 and 71 connected through electrical conductors 73 and 75 to the positive and negative terminals, respectively, of a source of electrical energy or battery 76. Opposite switch contacts 77 and 79 are connected to a conductor 81 leading to the stainless steel printing roller 25, as will be explained hereinafter in greater detail with reference to FIGURES 1, 3 and 5.

It will be seen then that the two-way switch 67 is operable in one position to cause the switch blade 71 to close the switch contact 65 simultaneously with the switch blade 69 closing the switch contact 79 so as to in effect connect the positive terminal of the battery 76 through the box 12 and auxiliary rollers 90 and 92 to the stainless steel printing roller 25 and a negative terminal of the battery 76 through the probe 50 to the pad 55 leading to the selected circuit for test of the printed circuit board 42. An alternate position of the two-way switch 67 the switch blade 69 may close the switch contact 63 simultaneously with the switch blade 71 closing the switch contact 77 so as to in effect reverse the electrical connections from the source of electrical energy or battery 76 by in effect connecting the positive terminal of the battery 76 to the probe 50 and a negative terminal of the battery 76 to the printing roller 25 for a purpose which will be explained in greater detail hereinafter.

The stainless steel printing roller 25 is supported in and carried by a roller assembly including a pair of auxiliary rollers 90 and 92, as shown in FIGURE 3. The auxiliary roller 90 is pivotally mounted by a shaft 94 between the inner ends of actuating rods 20, as shown in FIGURES 2 and 3.

The second auxiliary roller 92 has a shaft 96 and is biased toward the auxiliary roller 90 by springs 98 and 100 connected at opposite ends to the shafts 94 and 96 at the opposite ends of the rollers 90 and 92, respectively.

The printing roller 25 rests in rolling contacting relation between the auxiliary rollers 90 and 92 biased one toward the other by the springs 98 and 100 so that in effect the printing roller 25 is carried by the respective auxiliary rollers 90 and 92 under tension of the springs 98 and 100 and biased thereby into contacting relation with the underside of the platen 27 and the electrosensitive recording paper or web 37 which extends between the roller 25 and the platen 27 and the terminals 56 of the selected circuit of the printed circuit board 42 which is held in the recess 40 formed in the underside of the platen 27 by a suitable adhesive material therein.

As thus assembled, the handle 22 of the actuating rods 20 may be positioned by the operator so as to move the roller assembly including the printing roller 25 and the auxiliary rollers 90 and 92 across the interior surface of the box 12, as indicated in FIGURES 1, 2 and 3. The auxiliary rollers 90 and 92 roll along the inner bottom surface of the box 12, while the roller 25 effects a printing operation on the electrosensitive recording paper 37, as hereinafter explained.

The electrosensitive recording paper or web 37 may be of a suitable type well known in the art. One of the first of such electrosensitive type recording paper was a starch iodide recording paper used extensively in sonar depth sound recorders by the British and by our own Services. This recording paper fades after a short time and has other shortcomings.

Another electrosensitive paper was the catechol paper, a moist electrosensitive paper which was used in early picture recordings and which gave a dense trace on an essentially white background. It is not possible to roll up this type of recording paper while it is moist, because of bleeding and transfer of the recorded marks. The paper is not suited for high speed recording, and requires excessive marking power. It is a difficult paper to stabilize, due to characteristics of the catechol itself.

Another type of electrosensitive recording paper or web is saturated with an electrolyte which discolors in the presence of ferrous ions so that the positively charged printing roller of a steel or iron bearing material may print out ferrous ions on the paper at the point of electrical conductivity of current from a positive terminal of the source of electrical energy to a negative terminal thereof.

In such case, either the roller 25 may be of an iron bearing material or the opposite node or terminals 56 of the circuit under test may be of an iron bearing material. The element of the iron bearing material is connected to the positive terminal of the source of electrical energy while the other element is connected to the negative terminal of the source of electrical energy. In such case, the electrosensitive recording paper reacts to a flow of current through it to indicate by a discoloration of the paper by ferrous ions the point of emergence of the current flow.

A type of electrosensitive recording paper or web which has been found particularly adapted for use in the continuity tester as the recording paper 37 has a high sensitivity and response and is sold under the trade name Alfax Type "A" Paper by the Alfax Paper and Engineering Company, Inc., Alden Research Center, Westboro, Mass.

OPERATION

In the operation of the tester 10, heretofore described, the switch 67 is positioned so as to cause the switch arm 69 to close the switch contact 79 and the switch arms 71 to close the switch contact 65 so that, as shown in FIGURES 1 and 5, the positive terminal of the source of electrical energy 76 is connected to the printing roller 25 formed of a suitable stainless steel or other iron bearing material while the negative terminal of the source of electrical energy 76 is connected through conductor 61 and probe 50 to a pad 55 of the printed circuit board 42 so as to cause a flow of current from the roller 25 through the electrosensitive recording paper 37 to an adjacent terminal 56 leading to the selected circuit of the multilayer printed circuit board 42 conductively connected to the pad 55. The stainless steel printing roller 25 of the roller assembly including the auxiliary rollers 90 and 92 is advanced across the inner surface of the bottom of the sheet metal box 10 by the operator positioning the handle 24 of the actuating bars 20 so as to successively energize the adjacent terminals 56. The stainless steel roller 25 is thus positioned in the box 10 so that the stainless steel roller 25 under the biasing force exerted by the springs 98 and 100 is pressed against the sheet of electrosensitive recording paper which may be of the Alfax Type "A," heretofore described. The recording paper 37 is pressed then in a line contact against the lower surface of the printed circuit board 42, shown in FIGURES 3 and 5, which is under test and which is held in the recess 40 in the underside of the platen 27 by a suitable adhesive material.

As the roller 25 is thus advanced across the surface of the printed circuit card 42 an image forms on the sheet of recording paper 37 which is pressed against the printed circuit card so as to indicate the points on the paper which are electrically continuous with the terminals of the selected circuit connected to the probe contactor 52 upon the probe 50 being inserted through one of a plurality of holes 47 of the platen 27, as heretofore described.

This image or discoloration is due to the ferrous ions plated from the stainless steel roller 25 and formed on the sheet of recording paper 37 at the point of emergence of the current flow. The image thus formed on the sheet of recording paper 37 may then be compared to a master image to verify that the appropriate points of conductivity appear thereon. A typical image formed on such an electrosensitive recording paper 37 is shown by way of example in FIGURE 6, in which there is indicated by the circled image a short in one of the electrical connections which has been identified by the test.

The printing process thus effected through the tester 10 is electrolytic in nature in that the electrosensitive recording paper or web 37 is first treated with an electrolytic solution that discolors in the presence of ferrous ions plated from the stainless steel printing roller 25. The tester 10 provides then in one pass a permanent record of the continuity or lack of continuity between the circuit selected by the probe 50 and all other points on the circuit of the printed circuit board 42 which are in a conductive circuit therewith.

CLEANING ACTION

In the forenoted printing operation, the electrosensitive recording paper 37 is so wetted with an electrolyte after the pass of the stainless steel roller 25 that the stainless steel roller 25 may become wet with the liquid electrolyte containing the ferrous ions so that the roller 25 on a second pass may tend to print on the paper by transferring the moistened electrolyte containing the ferrous ions back on to the paper 37 unless the printing roller 25 be held from making such a second pass until the wet surface area has dried so that no further printing action may be effected.

Alternatively, a second sheet of Alfax "A" Paper may be inserted between the roller 25 and the rollers 90 and 92 so as to clean the roller 25 of the accumulated electrolyte containing ferrous ions on the surface of the roller 25 before the next succeeding pass.

In another and probably more satisfactory method of cleaning the roller 25 of the accumulated electrolyte and ferrous ions is to advance the electrosensitive paper or web 37 to a second position and then reverse the polarity of the source of electrical energy 76 applied to the roller and probe 50 by positioning the switch 67 so that the switch blade 69 now closes the switch terminals 63 and the switch blade 71 closes the switch contact 77 so that in effect the positive terminal of the source of electrical energy 76 is now connected through the conductor 61 to the probe 50 while the negative terminal of the source of electrical energy 76 is now connected through the conductor 81, the conductive casing 12, and rollers 90 and 92 to the printing roller 25. Thereafter in making a return pass of the roller 25, the wet electrolyte on the roller 25 causes the ferrous ions therein to be plated back into the stainless steel roller 25. Also the resulting flow of current out from the terminals 56 of the printed circuit board 42 and through the electrosensitive recording paper 37 may result in some of the ferrous ions being printed on the paper while others of the ferrous ions may be printed back into the roller 25. This reverse printing or plating action thereby tends to clean the roller 25 of the ferrous ions in the wet electrolyte accumulated on the surface of the roller 25. Thereafter upon the switch 67 being once again positioned to the previous operative relation in which switch blade 69 closes switch contact 79 and switch blade 71 closes switch contact 65 the electrosensitive recording paper 37 may be adjusted to a succeeding third position. Thereafter the probe 50 may be selectively positioned by the operator into a second opening 47, whereupon a succeeding test operation may be effected on succeeding circuits selected by the position of the probe 50, as heretofore described.

From the foregoing, it was seen that there is provided a means and method whereby an electrosensitive recording paper or web 37 may be used to selectively determine the conductivity of circuits provided in a multilayer circuit board 42 and a tester in which the printing roller 25 provides a line rather than area contact with terminals of the selecter circuit through the electrosensitive recording paper 37 which enhances the resolution of the image formed on the recording paper by limitiing the spread of current flux through the paper. Furthermore, as heretofore explained, there is provided in the tester 10 means through operation of the switch 67 which may alternately effect a testing operation and a cleaning operation to condition the printing roller for succeeding test operations.

What is claimed is:

1. Apparatus for making a record of conductivity tests on multiple circuits in an electrical circuit board, each of the multiple circuits having multiple terminals, the apparatus comprising a casing including supporting means having a compartment at an inner side of the supporting means for receiving and holding the circuit board under test, a source of electrical energy, probe means electrically connected to one terminal of the source, and the supporting means having apertures therein for selectively receiving the probe means, the selected apertures in the supporting means being so rranged as to render the probe means effective to selectively connect a terminal of one of the multiple circuits to said one terminal of the source of electrical energy, means for holding an electrosensitive recording web adjacent a side of the circuit board and in a contacting relation with the multiple terminals of the selected circuit of said board, an electrically conductive roller assembly, means to connect the roller assembly to an opposite terminal of the source of electrical energy, the roller assembly being movable in the casing in contacting relation along the electrosensitive recording web to effect a discoloration of the recording web at each point of passage of electrical current between a conductive terminal of the circuit and the roller assembly and through the electrosensitive recording web so as to provide as the roller assembly passes along the electrosensitive web an image on the web corresponding to a conductive pattern of the terminals of the selectively connected circuit.

2. The apparatus defined by claim 1 in which the roller assembly includes a printing roller, a pair of auxiliary rollers, spring means to bias the auxiliary rollers one toward the other, and the printing roller being carried by the auxiliary rollers under tension of said spring means in contacting relation with the electrosensitive recording web.

3. The appartus defined by claim 2 including an actuating rod means having an inner end pivotally connected to one of said auxiliary rollers and an exteriorly mounted operator-operative hande to slidably position the roller assembly in the casing through the acuating rod means.

4. The apparatus defined by claim 1 in which the supporting means includes a platen of an insulating material providing a cover for the casing, a recess provided in an inner side of the platen for receiving the electrical circuit board, the platen including apertures therein opening from the exterior into the recess so that the probe means may be selectively positioned in said apertures to connect a terminal of one of the multiple circuits to said one terminal of the source of electrical energy.

5. The apparatus defined by claim 1 in which the roller assembly includes a printing roller of an iron bearing material, means for connecting the probe means to a negative terminal of the source of electrical energy, other means for connecting the printing roller to a positive terminal of the source of electrical energy, and the recording web being of a type saturated with an electrolyte such as to cause the iron bearing printing roller to discolor the recording web with ferrous ions at the point of emergence of an electrical current from the printing roller through the recording web to each of the conductive terminals of the selected circuit upon movement of the printing roller along the recording web so as to make a record of the conductivity of the selected circuit at each of the conductive terminals thereof.

6. The apparatus defined by claim 2 in which the supporting means includes a platen of an insulating material providing a cover for the casing, a recess provided in an inner side of the platen for receiving the electrical circuit board, the platen including apertures therein opening from the exterior into the recess so that the probe means may be selectively positioned in said apertures to connect a terminal of one of the multiple circuits to said one terminal of the source of electrical energy.

7. The apparatus defined by claim 3 in which the supporting means includes a platen of an insulating material providing a cover for the casing, a recess provided in an inner side of the platen for receiving the electrical circuit board, the platen including apertures therein opening from the exterior into the recess so that the probe means may be selectively positioned in said apertures to connect a terminal of one of the multiple circuits to said one terminal of the source of electrical energy.

8. The apparatus defined by claim 7 in which the roller assembly includes a printing roller of an iron bearing material, means for connecting the probe means to a negative terminal of the source of electrical energy, other means for connecting the printing roller to a positive terminal of the source of electrical energy, and the recording web being of a type saturated with an electrolyte such as to cause the iron bearing printing roller to effect a discoloration of the recording web with ferrous ions at the point of emergence of a flow of electrical current from the printing roller through the recording web to each of the conductive terminals of the selected circuit upon movement of the printing roller along the recording web so as to make a record of the conductivity of the circuit at each of the conductive terminals thereof.

9. The apparatus defined by claim 2 in which the roller assembly includes a printing roller of an iron bearing material, means for connecting the probe means to a negative terminal of the source of electrical energy, other means for connecting the printing roller to a positive terminal of the source of electrical energy, and the recording web being of a type saturated with an electrolyte such as to cause the iron bearing printing roller to effect a discoloration of the recording web with ferrous ions at the point of emergence of a flow of electrical current from the printing roller through the recording web and to each of the conductive terminals of the selected circuit upon movement of the printing roller along the recording web so as to make a record of the conductivity of the circuit at each of the conductive terminals thereof.

10. The apparatus defined by claim 3 in which the roller assembly includes a printing roller of an iron bearing material, means for connecting the probe means to a negative terminal of the source of electrical energy, other means for connecting the printing roller to a positive terminal of the source of electrical energy, and the recording web being of a type saturated with an electrolyte such as to cause the iron bearing printing roller to discolor the recording web with ferrous ions at the point of emergence of electrical current from the printing roller through the recording web to each of the conductive terminals of the selected circuit by movement of the printing roller along the recording web so as to make a record of the conductivity of the circuit at each of the conductive terminals thereof.

11. The apparatus defined by claim 5 including switching means for reversing the electrical connections of the probe means and roller assembly to the source of electrical energy so as to alternately connect the probe means to the positive terminal of the source of electrical energy and the roller assembly to the negative terminal of the source of electrical energy so as to effectively remove an accumulation of ferrous ions from the printing roller.

12. The combination defined by claim 8 including switching means for reversing the electrical connections of the probe means and roller assembly to the source of electrical energy so as to alternately connect the probe means to the positive terminal of the source of electrical energy and the roller assembly to the negative terminal of the source of electrical energy so as to effectively remove an accumulation of ferrous ions from the printing roller.

13. In the art of recording data on a record sheet relative to conductivity tests made on a circuit of a circuit board having multiple terminals, apparatus comprising a recorder including a record sheet, marking means for the sheet responsive to flow of electrical energy relative to each conductive terminal of the circuit, said marking means including a movable electrical conductive member, supporting means for receiving the circuit board, probe means, the supporting means including apertures for selectively receiving the probe means, the selected apertures in the supporting means being so arranged as to render the probe means operable for selectively applying electrical energy to each of the multiple terminals of the circuit to render the marking means effective on the record sheet at the point of emergence of electrical energy relative to said terminals upon movement of the conductive member along the record sheet, the movable electrical conductive member being of an iron bearing material, a source of electrical energy, first means connecting a positive terminal of the source of electrical energy to the iron bearing movable member, second means connecting a negative terminal of the source of electrical energy to the probe means and thereby to one of the multiple terminals of the circuit of the circuit board, the record sheet being of a type saturated with an electrolyte such as to cause the iron bearing movable electrical conductive member to discolor the record sheet with ferrous ions at a point of emergence of a flow of electrical current from the conductive member and in passing through the record sheet to each of the selected conductive terminals upon movement of the iron bearing conductive member along the record sheet so as to make a record on the sheet of the conductivity of the circuit through each of the conductive terminals, and means operable to reverse the first and second connecting means so as to alternately connect the positive terminal of the source of electrical energy to one of the multiple terminals of the circuit board and the negative terminal of the source of electrical energy to the movable electrical conductive member so as to effectively remove accumulated ferrous ions from said movable member by a reverse plating action to clean the movable member thereby.

14. In the art of recording on a sheet of paper an image representing a conductivity status of a selected circuit of a plurality of circuits of a multilayer printed circuit board, said slected circuit having a plurality of terminals arranged in a predetermined relation, a method which comprises selectively making electrical contact with one of a first group of said terminals, positioning one side of a sheet of electrostatic recording paper of a type saturated with an electrolyte over other of a second group of the terminals of the circuit, connecting a negative terminal of a source of electrical energy to the selected terminal of the first group of terminals of the selected circuit, passing an iron bearing roller electrically connected to a positive terminal of the source of electrical energy in a line contact with the sheet of recording paper along an opposite side thereof so as to cause a selective flow of electrical current from the iron bearing roller through the sheet of recording paper to each conductive terminal of the second group of terminals upon the roller passing adjacent thereto, providing on the recording paper at points of emergence of a flow of electrical current from the terminals of the second group a discoloration of ferrous ions forming the image representing the conductivity status of the terminals of the selected circuit, an additional step of reversing the connections to the terminals of the source of electrical energy so as to connect the positive terminal of said source to the terminal of the selected circuit and the negative terminal of said source to the iron bearing roller, positioning one side of another sheet of electrostatic recording paper of a type saturated with an electrolyte over the terminals of the circuit, and repassing the iron bearing roller along an opposite side of the other sheet of electrostatic recording paper so as to effect a removal of ferrous ions accumulated on the roller.

References Cited

UNITED STATES PATENTS

| | | | |
|---|---|---|---|
| 2,642,481 | 6/1953 | Wilson. | |
| 2,710,786 | 6/1955 | Tyler | 346—74 |
| 2,981,585 | 4/1961 | Lower | 346—74 XR |
| 3,074,067 | 1/1963 | Gallentine | 346—74 XR |
| 3,156,866 | 11/1964 | Anderson | 342—72 |
| 3,393,362 | 7/1968 | Wright | 324—71 |
| 3,396,335 | 8/1968 | Burr | 324—51 |
| 3,414,814 | 12/1968 | Gilbertson | 324—73 |

RUDOLPH V. ROLINEC, Primary Examiner

E. L. STOLARUN, Assistant Examiner

U.S. Cl. X.R.

324—51, 73; 346—33, 74